Jan. 17, 1928. 1,656,625

E. FINSEN ET AL

CHUCK FOR GEAR GENERATING MACHINES

Filed June 5, 1926

INVENTORS
Eyvind Finsen &
Schuyler H. Earl
BY
ATTORNEY

Patented Jan. 17, 1928.

1,656,625

UNITED STATES PATENT OFFICE.

EYVIND FINSEN AND SCHUYLER H. EARL, OF ROCHESTER, NEW YORK, ASSIGNORS TO GLEASON WORKS, OF ROCHESTER, NEW YORK, A CORPORATION OF NEW YORK.

CHUCK FOR GEAR-GENERATING MACHINES.

Application filed June 5, 1926. Serial No. 113,990.

The subject of the present invention is a chuck and the invention relates more particularly to chucks for securing gears or gear blanks in position upon machines upon which work is to be done upon a gear or blank.

The primary object of the present invention is to provide a chuck which may be constructed of a few simple parts which will be simple in operation and of low cost.

A further object of this invention is to provide a chuck for gear generating machines and a control means therefor of such form that the chuck may be quickly and easily controlled by the operator of the machine.

A still further object of this invention is to provide a chuck for gear generating machines and a control means therefor which will permit of the rolling motions required in such machines to generate the tooth profiles and which at the same time will enable the gear blank to be quickly clamped in position or released therefrom.

Other objects of the invention will be apparent hereinafter from the specification and from the recital of the appended claims.

A preferred embodiment of the invention is illustrated in the accompanying drawing, in which.

Figure 1:
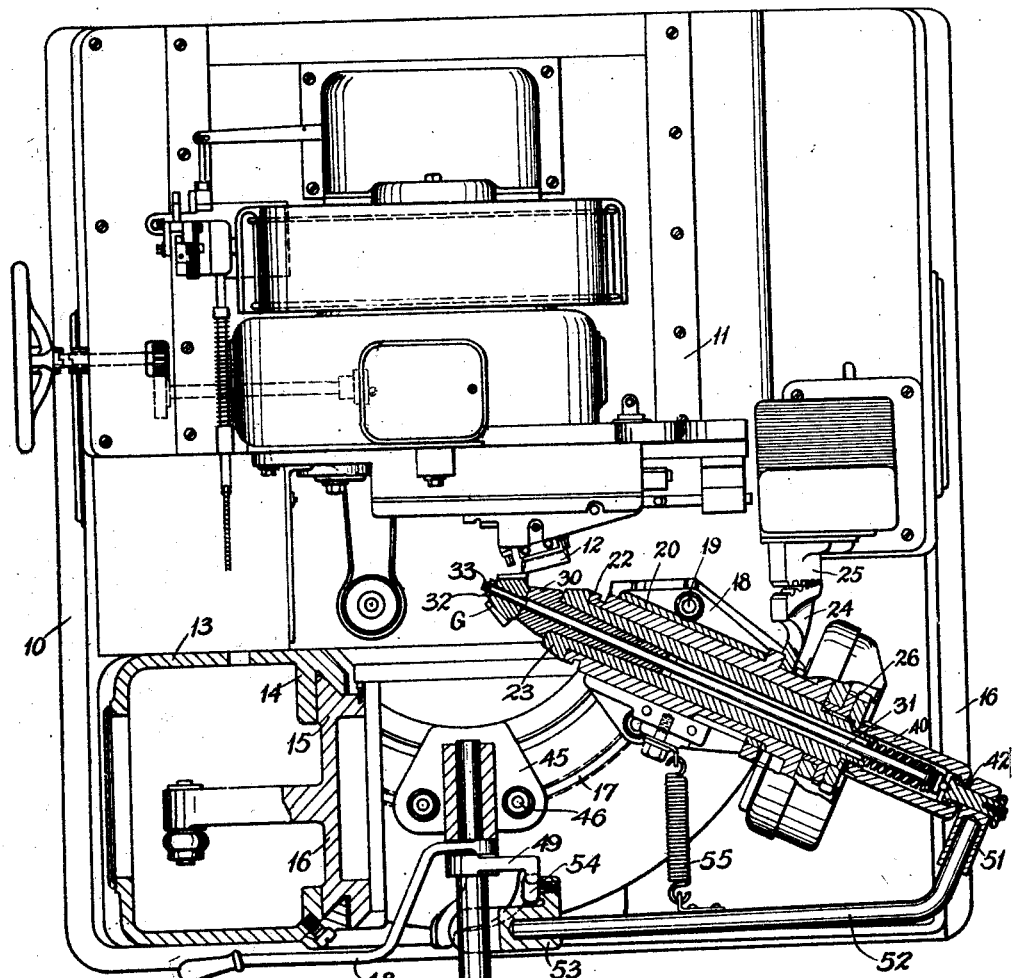
Figure 1 is a plan view, partly in section, of a gear generating machine, showing a preferred embodiment of this invention in use thereon.
Figure 2:
Figure 2 is a fragmentary view looking in the direction of the blank, showing the means employed for securing the blank in clamped position.
Figure 4:
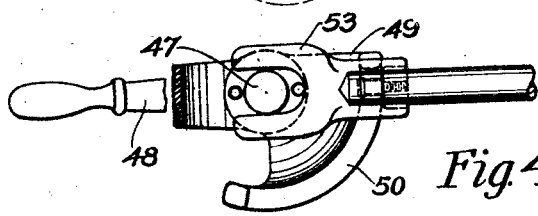
Figure 4 is a side elevation, partly in section, of the control lever and cam.
Figure 3:
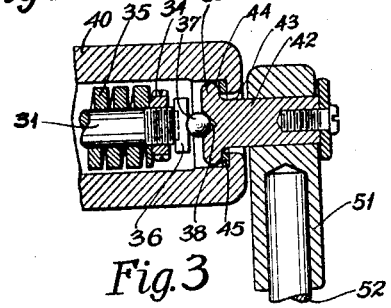
Figure 3 is an enlarged detail sectional view showing the outer end of the chuck rod and the means for controlling the same.

In Figure 1, one form of chuck constructed according to this invention is shown in use upon a gear generating machine of the type described in the copending application of James E. Gleason et al., Serial No. 624,962, filed March 14, 1923. It will be understood, however, that the invention is capable of use upon other forms of machines for producing gears, whether generating or forming and that, in general, it is capable of such further uses and of such further modifications as fall within the scope of the invention and within the limits of the appended claims.

The machine shown includes a bed or frame 10 upon which is slidably adjustable a tool head 11 which carries a pair of reciprocating tools, one of which 12 is to be seen in the drawing. The frame 10 is provided with an upright portion 13 provided with ways 14 within which are guided the ways 15 of an oscillatory carrier or cradle 16. The cradle or carrier 16 is provided on its upper surface with circular slots 17. Mounted on the cradle 16 is a support 18 upon which the blank or gear G to be operated upon is carried. The support 18 is angularly adjustable upon the cradle so that the blank or gear G may be brought into proper operating relation with respect to the tools. This support 18 may be secured in any adjusted position by means of bolts 19 which engage in the circular T-slots 17. Journaled within a pedestal 20 on the blank carrier or support 18, is a sleeve 22. Within this sleeve 22 is rotatably mounted a second sleeve 23 to which the blank or gear to be operated upon is secured. Secured to the sleeve 22 is a bevel gear segment 24 which meshes with a stationary segment 25 mounted on the frame of the machine. In the operation of the machine shown, the tooth surfaces are generated by imparting reciprocatory movements to the tools and simultaneously effecting a relative rolling motion between the tools and blank. This rolling motion consists of a rotary movement of the blank on its axis combined with a rotary movement of the cradle on its axis. The rolling motion is effected from the cradle. During the cutting operation the sleeves 22 and 23 are connected together by the elements of the indexing mechanism which are indicated generally at 26 and which are described more particularly in the application above referred to and the movement of the cradle causes the bevel gear segment 24 to roll upon the stationary segment 25, thus rotating the sleeves 22 and 23 and the blank G which is secured to the sleeve 23, as will presently be described. The combined rotation of the sleeve 23 and of the cradle 16 constitute the generating or rolling motion of the machine. After a cutting operation has been completed, the tool and blank are withdrawn relatively to each other, as described in the application mentioned, and the blank indexed. During this indexing period the cradle movement is reversed. The reverse movement of the cradle causes the segment 24 to roll in the opposite direction on the segment 25.

The purpose of the present invention is to provide a form of chuck which may be employed to firmly secure a blank in position and which at the same time will be of simple construction, and which can be instantly operated. In the preferred form of the present invention, a heavy coiled spring is employed for holding the blank clamping means in clamping position while a lever is employed for moving the rod, which carries this clamping means, against the action of this spring so as to release the gear.

Mounted within the sleeve 23 is an arbor 30 which is provided with a tapered portion which seats in a similarly tapered portion of the bore of the sleeve 23. The blank or gear G to be operated upon is clamped against the outer face of this arbor 30. Extending through the bore of the gear, the bore of the arbor 30 and the bore of the sleeve 23 is a reciprocable rod 31. This rod carries the means for holding the gear in clamped position. The clamping means may be of any usual or suitable form. In the embodiment illustrated, a horseshoe washer 32 is provided. The rod is provided with a circumferential recess and the washer is slipped into this recess. When the rod is moved rearwardly in the sleeve 23 under action of the coiled spring, as will presently be described, the horseshoe washer engages the face of the gear and clamps the gear against the outer face of the arbor 30. This rearward movement acts also to firmly seat the arbor in the sleeve 23, so that during the operation of the machine, the blank G is firmly secured in position.

The rod 31 is screw-threaded adjacent its inner end and carries a nut 34 between which and the inner end of the sleeve 23 there is interposed a heavy coiled spring 35. This spring 35 serves to constantly urge the rod into and hold it in clamping position. The tension on the spring 35 may be adjusted, as is obvious, by adjusting the nut 34. The inner end of the rod is headed as indicated at 36. The head 36 seats against a ball 37 which is mounted in a socket 38 provided in a mushroom headed member 39. The mushroom member 39 is mounted for tilting or rocking movement in a sleeve 40 which is screw-threaded upon the outer end of the sleeve 23. This sleeve 40 has the further functions of guarding this spring and of acting also as a means for retaining the index plate and the parts of the indexing mechanism 26 in position.

The mushroom member 39 has a curved outer face 44 which seats on a flat washer 45 which is secured in the sleeve 40. The mushroom member 39 is provided with a stem or stud 42 which extends through an opening 43 provided in the end of the sleeve 40 and the mushroom member may be rocked by moving this stem or stud. The construction of the mushroom member and the cooperating parts is such that when the mushroom member is aligned with the rod 31, the spring 35 will hold the rod in clamping position, but when the mushroom member is rocked or tilted from a position of alignment with the rod into a position at an angle thereto, the rod 31 will be forced forward in the sleeve 23, the arbor 30 and the bore of the gear G, against the action of the spring, thereby releasing the horseshoe washer 32 from clamping position and permitting the same to be lifted off of the rod or to drop away from the same by gravity.

Any suitable means may be employed for rocking the mushroom member 39. When a chuck constructed according to the present invention is employed upon a gear generating machine, it is preferable to provide some means for operating the chuck which will be both readily accessible to the operator of the machine and which at the same time will not interfere with the rolling motion of the machine. During the operation of the machine described the blank support rolls up and down due to the oscillation of the cradle 16. The mushroom member 39 consequently must be controlled from some member which is mounted coaxially of the cradle 16 and which is connected to the mushroom member so as to permit free movement of this member during the roll without rocking it. Such a construction is shown in the accompanying drawing. 45 indicates a bracket which is adjustable on the cradle and which may be secured in any adjusted position thereon by means of bolts 46 which engage in the circular T-slots 17. Journaled in this bracket 45 is a shaft 47 to which is secured a crank 48. Secured to the crank 48 is a member 49 provided with an outer cam surface 50. Journaled on the stem or stud 42 of the mushroom member 39 is a sleeve 51 to which is secured one end of the angle lever 52. The opposite end of this lever is secured to a bifurcated member 53, the arms of which extend on either side of the shaft 47. This bifurcated member 53 carries a roller 54. A spring 55 one end of which is secured to the lever arm 52 and the other end of which is secured to the pedestal 20 serves to maintain the roller 54 in contact at all times with the cam surface 50 of the member 49.

When the apparatus is in the position shown in Figure 1 the blank is clamped in position. As the cradle rolls up and down the stud 42 will rotate in the sleeve 51 and thus the operations of the machine may proceed without any interference from the lever 52 or without the mushroom member 39 being actuated into released position. If for any reason the stud does not rotate in the sleeve, the rolling movement may still take place without rocking the mushroom member, for the mushroom member will then rotate on the ball 37. When the required operations on the blank have been completed, the blank may be released for removal from the machine by rotating the lever arm 48. Rotation of this arm causes the member 49 to rotate and through the cam 50 moves the lever 52 outwardly against the action of the spring 55 thereby rocking the mushroom member 39 in the opening 43 of the sleeve 40 and forcing the rod 31 forwardly against the action of the spring 35. The horseshoe washer 32 can then be removed or will of itself drop away. The gear G can then be drawn over the outer end of the rod and taken off the machine. When a new blank is to be chucked, the blank is pushed on the rod 31, the horseshoe washer 32 is dropped into place and the crank 48 is rotated to rock the mushroom member back into neutral position, thus permitting the spring 35 to expand and clamp the blank in position.

Instead of a horseshoe washer, it is obvious that any other suitable form of clamping means may be employed with this invention, as, for instance, the expansible bushing described in the copending application of Schuyler H. Earl, Serial No. 723,287, filed June 30, 1924.

While the present invention has been described in connection with a machine for generating gears it is not intended to limit the invention to this use, but it may be employed on any form of machine for producing gears and upon other forms of machines also.

In general, it may be said, that, while we have described a preferred embodiment of our invention, the invention is capable of further modification within its limits and the scope of the appended claims, and that this application is intended to cover any variations, uses, or adaptations of the invention following, in general, the principles of the invention and including such departures from the present disclosure as come within known or customary practice in the art and may be applied to the essential features hereinbefore set forth and as fall within the scope of the appended claims.

Having thus described our invention, what we claim is:

1. In a chuck, the combination of a sleeve, a rod reciprocable in said sleeve and in the bore of the object to be chucked, means carried by said rod adapted to engage the outer face of the object, a tiltable member mounted in the sleeve and provided with a curved outer face seating against a seat provided, therefore, in said sleeve, a coil spring interposed between said rod and sleeve for forcing the rod and clamping means axially in one direction to engage the object to clamp the object on the sleeve and for maintaining the rod in operative relation with the opposite face of said tiltable member and means for rocking said tiltable member to force the rod in the opposite direction against the action of the spring to release the object.

2. In a chuck, the combination of a sleeve, a rod reciprocable in said sleeve and in the bore of the object to be chucked, means carried by the rod adapted to engage the outer face of said object, a coil spring interposed between said rod and sleeve for forcing the rod and clamping means axially to engage the object to clamp the object on the sleeve, a tiltable member arranged in operative relation to the rod and adapted to be rocked from a position of alignment with the rod to a position at an angle thereto for moving the rod against the resistance of the spring to release the object and means for rocking said member.

3. In a gear generating machine, a rotatable blank support, a cutter mechanism, a movable cradle upon which the blank support is mounted, means for positioning the tool and blank in operative relationship, means for clamping an object on the blank support and the means for releasing said clamping means, comprising, a movable member having a cooperative relation with the clamping means, a lever arm for moving said member journaled on said member, a cam mounted for rotation on an axis coinciding with the axis of said cradle and having an operative connection with the lever arm, and means for rotating the cam.

4. In a gear generating machine, a tool, a rotatable blank support, a movable cradle upon which the blank support is mounted, means for positioning the tool and blank in operative relationship, a member adapted to be moved axially in one direction to clamp a blank on the blank support and to be moved axially in the opposite direction to release the blank, a movable member for controlling the movements of the first named member rotatably mounted coaxially of the blank support, a crank, mounted coaxially of the cradle, and means connecting the crank with a movable member whereby the movable member may be actuated on rotation of the crank.

5. In a gear generating machine, a tool, a rotatable blank support, a movable cradle upon which the blank support is mounted, means for positioning the tool and blank in operative relationship, a clamping member for clamping a blank upon the blank support, spring means for retaining said member in clamping position and means for moving said clamping member against the resistance of the spring comprising an arm journaled coaxially of the blank support, a cam rotatably mounted coaxially of the cradle and means operatively connecting the cam and arm.

6. In a gear generating machine, a tool, a rotatable blank support, a movable cradle upon which the blank support is mounted, means for positioning the tool and blank in operative relationship, a member adapted to be moved axially in one direction to clamp a blank on the blank support and to be moved axially in the opposite direction to release said blank, a tiltable member adapted to be rocked from a position of alignment with said member to a position at an angle thereto to move the first named member into released position, an arm journaled on said tiltable member, a crank rotatably mounted coaxially of said cradle and means connecting said crank with said movable member whereby said movable member may be actuated on rotation of the crank.

7. In a gear generating machine, a tool, a rotatable blank support, a movable cradle upon which the blank support is mounted, means for positioning the tool and blank in operative relationship, a member adapted to be moved axially in one direction to clamp a blank on the blank support and to be moved axially in the opposite direction to release said blank, a tiltable member adapted to be rocked from a position in alignment with the first member to a position at an angle thereto to move the first member into released position, a cam rotatably mounted coaxially of the cradle, a double armed lever, one arm of which is arranged at an angle to the tiltable member and is journaled thereon, and the other arm of which carries a follower adapted to engage said cam, and means for holding the follower in engagement with the crank.

8. In a gear generating machine, a tool, a rotatable blank support, a movable cradle upon which the blank support is mounted, means for positioning the tool and blank in operative relationship, a member adapted to be moved axially in one direction to clamp a blank on the blank support and to be moved axially in the opposite direction to release said blank, spring means for urging said member constantly into clamping position, a tiltable member adapted to be rocked from a position of alignment with said member to a position at an angle thereto to move the first named member against the resistance of the spring, a ball and socket connection between said first member and the tiltable member, an arm journaled on the tiltable member, a cam rotatably mounted coaxially of the cradle, a roller carried by the arm adapted to engage the cam, means for holding the roller in engagement with the cam, and means for rotating said cam.

9. In a chuck, the combination of a sleeve, a rod reciprocable in said sleeve, means carried by said rod adapted to engage the outer face of an object to be chucked, a coil spring interposed between said rod and sleeve for forcing the rod axially in said sleeve to clamp the object on the sleeve, a tiltable member mounted in said sleeve having a stem portion extending through an opening in the outer end of said sleeve and provided with a socket in its front face and with a rounded outer face adapted to seat against a flat surface provided on the inner end face of said sleeve, a ball abutting the end face of said rod and seating in the socket of said member, and means secured to said stem for rocking said member.

10. In a chuck, the combination of a sleeve, a rod reciprocable in said sleeve, means carried by said rod adapted to engage the outer face of the object to be chucked, means for forcing the rod axially in said sleeve to clamp the object on said sleeve, a tiltable member mounted in said sleeve and provided with a socket in its front face and with a rounded outer face adapted to seat in said sleeve, a ball abutting the end face of said rod and seating in the socket in said member and means for rocking said member from a position of alignment with said rod to a position at an angle thereto to release the clamping means.

EYVIND FINSEN.
SCHUYLER H. EARL.